US007465038B2

(12) United States Patent
Sugahara

(10) Patent No.: US 7,465,038 B2
(45) Date of Patent: Dec. 16, 2008

(54) LIQUID TRANSPORTING APPARATUS AND METHOD OF MANUFACTURING LIQUID TRANSPORTING APPARATUS

(75) Inventor: Hiroto Sugahara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 456 days.

(21) Appl. No.: 11/275,157

(22) Filed: Dec. 15, 2005

(65) Prior Publication Data

US 2006/0132547 A1 Jun. 22, 2006

(30) Foreign Application Priority Data

Dec. 16, 2004 (JP) ............................ 2004-363954

(51) Int. Cl.
*B41J 2/045* (2006.01)
*B23P 17/00* (2006.01)

(52) U.S. Cl. ....................................... 347/68; 29/890.1

(58) Field of Classification Search .................. 347/70, 347/72

See application file for complete search history.

(56) References Cited

U.S. PATENT DOCUMENTS

| | | | | | |
|---|---|---|---|---|---|
| 6,074,047 | A * | 6/2000 | Hotomi et al. | 347/70 |
| 7,270,404 | B2 * | 9/2007 | Mita | 347/68 |
| 7,396,113 | B2 * | 7/2008 | Mita | 347/68 |
| 2003/0016273 | A1 | 1/2003 | Sakamoto et al. | |
| 2004/0141032 | A1 | 7/2004 | Matsuzawa et al. | |
| 2004/0223035 | A1 | 11/2004 | Hirota | |

FOREIGN PATENT DOCUMENTS

| | | | |
|---|---|---|---|
| EP | 1232865 | A2 | 8/2002 |
| JP | 2004284109 | A | 10/2004 |

OTHER PUBLICATIONS

European Search Report (3 pages) for (corresponding) European Patent Application No. 05027508.0.

* cited by examiner

*Primary Examiner*—Matthew Luu
*Assistant Examiner*—Lisa M Solomon
(74) *Attorney, Agent, or Firm*—Baker Botts L.L.P.

(57) ABSTRACT

In a liquid transporting apparatus, when a thickness of a vibration plate is Tv (mm), a coefficient of elasticity of the vibration plate is Ev (kg/mm$^2$), a thickness Tp of a piezoelectric layer is Tp (mm), a coefficient of elasticity of the piezoelectric layer is Ep (kg/mm$^2$), a length of a pressure chamber is Wc (mm), a length of partition wall sections in a width direction of the pressure chamber is Wa (mm), a thickness Ta of an adhesive layer interposed between the partition wall sections and the vibration plate is Ta (mm), a coefficient of elasticity of the adhesive layer is Ea (kg/mm2), and further when $A=((Tv+Tp)^3\times(Ev+Ep)/2)/Wc^{1/2}$ and $B=Ea\times Wa/Ta$, values of A and B satisfy a relationship of $-0.03A-1200(1/B)+0.08>0$. Accordingly, a fluctuation in a liquid transporting velocity due to difference in drive patterns of pressure chambers can be suppressed assuredly without performing any special process on a piezoelectric actuator.

15 Claims, 14 Drawing Sheets

LIQUID TRANSPORTING APPARATUS AND METHOD OF MANUFACTURING LIQUID TRANSPORTING APPARATUS

BACKGROUND OF THE INVENTION

1. Field of the Invention

The present invention relates of a liquid transporting apparatus which transports liquid, and a method of manufacturing the liquid transporting apparatus.

2. Description of the Related Art

An ink-jet head which discharges ink from nozzles includes an actuator which imparts discharge energy to the ink. Actuator having various structures can be employed as such actuator. However, a piezoelectric actuator which includes a piezoelectric layer formed of a ferroelectric piezoelectric material such as lead zirconate titanate (PZT), and which drives an object by using a deformation of the piezoelectric layer when an electric field acts on the piezoelectric layer, is widely known (for example, see U.S. Patent Application Publication No. US 2004/0223035 A1 corresponding to Japanese Patent Application Laid-open No. 2004-284109). The piezoelectric actuator described in U.S. Patent Application Publication No. US 2004/0223035 A1 includes a plurality of piezoelectric sheets adhered to one surface of a channel unit to cover an entire area in which a plurality of pressure chambers is formed, a plurality of individual electrodes which is arranged corresponding to the plurality of pressure chambers respectively on a surface of an uppermost piezoelectric sheet of the piezoelectric sheets, and common electrodes formed between the piezoelectric sheets. Further, when a drive voltage is applied to the individual electrodes, an electric field acts in a direction of thickness which is a polarization direction of the piezoelectric sheet sandwiched between the individual electrode and the common electrode, and the piezoelectric sheet is elongated in the direction of thickness and is contracted in a direction parallel to a plane. In this case, a vibration plate is deformed when of the piezoelectric sheet is deformed. Therefore, a volume of the pressure chamber is changed and a pressure is exerted on ink in the pressure chamber.

In the piezoelectric actuator described in U.S. Patent Application Publication No. US 2004/0223035 A1, the plurality of piezoelectric sheets are arranged to cover entirely the area in which the plurality of pressure chambers of the channel unit is formed (the area including partition wall sections which separate the pressure chambers). Therefore, when a portion of a piezoelectric sheet which overlaps with a certain pressure chamber is deformed, a so-called phenomenon of cross talk occurs in which this deformation is propagated to other portion of the piezoelectric sheet which overlaps with another pressure chamber adjacent to the pressure chamber, thereby deforming the another portion. In this case, depending on the number of pressure chambers which are driven at the same time (pressure is exerted on the ink inside the pressure chambers), an amount of deformation of each piezoelectric sheet which overlaps with each pressure chamber varies and there is a fluctuation in a velocity of an ink droplet, due to which a print quality is deteriorated. In this case, to suppress the cross talk, it is considered to form a groove or the like in the piezoelectric sheet so as to hinder the propagation of deformation. However, in this case, the piezoelectric sheet may become susceptible to chipping or a crack. In view of this problem, it is desirable to suppress to minimum the fluctuation of the velocity of the ink droplet which is caused due to the cross talk, by determining appropriately a value of each of the parameters of the piezoelectric actuator such as a thickness of the piezoelectric sheet and a thickness of an adhesive layer which adheres the piezoelectric sheet and the channel unit.

SUMMARY OF THE INVENTION

An object of the present invention is to provide a liquid transporting apparatus which is capable of suppressing a fluctuation in a liquid transporting velocity due to difference in drive patterns of a pressure chamber without performing a special process on the piezoelectric actuator, and a method of manufacturing the liquid transporting apparatus.

According to a first aspect of the present invention, there is provided a liquid transporting apparatus including a channel unit which includes a plurality of pressure chambers arranged along a flat plane and in which the pressure chambers are separated by partition wall sections; and a piezoelectric actuator which is arranged on one surface of the channel unit and which changes selectively a volume of the plurality of pressure chambers, wherein the piezoelectric actuator includes: a vibration plate which is adhered to the partition wall sections to cover the plurality of pressure chambers; a piezoelectric layer which is arranged on a side of the vibration plate opposite to the pressure chambers to cover all of the plurality of pressure chambers as viewed from a direction orthogonal to the flat plane; a plurality of individual electrodes which are arranged on one surface of the piezoelectric layer corresponding to the plurality of pressure chambers respectively, and a common electrode which is arranged on the other surface of the piezoelectric layer; and wherein a thickness of the piezoelectric layer or a thickness of an adhesive layer between the vibration plate and the partition wall sections is determined based on a parameter which is represented by $A=((Tv+Tp)^3\times(Ev+Ep)/2)/Wc^{1/2}$ wherein a thickness of the vibration plate is Tv (mm), a coefficient of elasticity of the vibration plate is Ev (kg/mm$^2$), the thickness of the piezoelectric layer is Tp (mm), a coefficient of elasticity of the piezoelectric layer is Ep (kg/mm$^2$), and a length of each of the pressure chambers in a predetermined direction is Wc (mm).

In this liquid transporting apparatus, when a drive voltage is applied to a certain individual electrode, a parallel electric field is generated in a portion of the piezoelectric layer positioned between this individual electrode and the common electrode, in a direction of thickness which is a polarization direction. In this case, this portion of the piezoelectric layer is elongated in a direction of thickness and is contracted in a direction parallel to the surface. The vibration plate is deformed as the piezoelectric layer is deformed. As the vibration plate is deformed, a volume of the pressure chamber is changed and a pressure is exerted on a liquid in the pressure chamber. In this case, since the piezoelectric layer is formed on the side of the vibration plate opposite to the pressure chambers to cover all of the plurality of pressure chambers, a so-called phenomenon of cross talk occurs in which a deformation of a portion of the piezoelectric layer overlapping with a certain pressure chamber is propagated to other portion of the piezoelectric layer which overlaps with another pressure chamber adjacent to the pressure chamber. In this case, since an amount of deformation of the vibration plate in each of the pressure chambers varies due to difference in number of pressure chambers which are driven at the same time, a transporting velocity of the liquid is fluctuated due to difference in drive patterns. However, the inventor of the present invention conducted a research and discovered that by using the above parameter represented by A, it is possible to determine generally the thickness of the piezoelectric layer or the thickness of the vibration plate which can reduce the cross talk even in various actuators different in distance between the pressure chambers (or distance between the partition wall sections). The parameter represented by A is a scale of a magnitude of stiffness of the actuator portion, but is considered to be theoretically proportional to $1/Wc^{1/3}$. However, the inventor conducted experiments by using $1/Wc^{1/2}$ rather than $1/Wc^{1/3}$, and the inventor succeeded in determining the thickness of the piezoelectric layer or the thickness of the vibration plate which is capable of reducing the cross talk and reducing the fluctuation in the liquid transporting velocity, and which can be applied to various actuators different in distances between the pressure chambers (or distance between the partition wall sections). By using the piezoelectric layer or the vibration plate having the thickness determined in such a manner, it was possible to realize a liquid transporting apparatus in which the fluctuation of the liquid transporting velocity, due to the difference in the drive patterns of the pressure chamber, is suppressed sufficiently.

Furthermore, the inventor of the present invention discovered that it is possible to reduce the fluctuation in the liquid transporting velocity by suppressing the fluctuation in the amount of deformation of the vibration plate in each of the pressure chambers, due to the difference in the drive patterns of the pressure chamber, when a predetermined relationship between a new parameter A and another parameter B which are defined by parameters of the piezoelectric actuator such as the thickness Tp of the piezoelectric layer and the thickness Ta of the adhesive layer is satisfied. The predetermined relationship, in other words, is values of A and B satisfying $-0.03A-1200(1/B)+0.08>0$ wherein a length of each of the partition wall sections in the predetermined direction is Wa (mm), a thickness of the adhesive layer which is interposed between the partition wall sections and the vibration plate and which adheres the partition wall sections and the vibration plate is Ta (mm), a coefficient of elasticity of the adhesive layer is Ea ($kg/mm^2$), and $B=Ea\times Wa/Ta$. Moreover, in this case, the fluctuation in transporting characteristics can be suppressed assuredly without performing any special process such as a recessing on the vibration plate and the piezoelectric layer.

In the present invention, "the piezoelectric layer is arranged to cover all of the plurality of pressure chambers" means that the piezoelectric layer is arranged to overlap entirely at least an area in which the plurality of pressure chambers is formed (including the partition wall sections which separate the pressure chambers), and the piezoelectric layer may cover the entire area of the vibration plate and the channel unit. Moreover, the present invention is not limited to the liquid transporting apparatus having a construction in which the vibration plate and the channel unit are bonded by an adhesive, and also includes those having a construction in which the vibration plate and the channel unit are joined by a metallic diffusion joining, for example. Thus, when the vibration plate and the channel unit are joined without using an adhesive, the thickness of the adhesive layer Ta is zero. For example, when the vibration plate is joined to the partition wall sections by the metallic diffusion joining, the thickness Tp of the piezoelectric layer may satisfy a relationship of $0.08>0.03\times((Tv+Tp)^3\times(Ev+Ep)/2)/Wc^{1/2}$.

Moreover, in the present invention, furthermore, the values of A and B may satisfy a relationship of $-0.03A-700(1/B)+0.05>0$. In this case, the fluctuation in the transporting velocity caused by the cross talk can be suppressed even more effectively.

The vibration plate may function as the common electrode. Accordingly, since one part is sufficient to serve as the vibration plate and the common electrode, it is possible to reduce the number of components.

According to a second aspect of the present invention, there is provided a method of manufacturing a liquid transporting apparatus which includes a channel unit which has a plurality of pressure chambers arranged along a flat plane and in which the pressure chambers are separated by partition wall sections; and a piezoelectric actuator which is arranged on one surface of the channel unit, which changes selectively a volume of the plurality of pressure chambers, and which includes a vibration plate which covers the plurality of pressure chambers, a piezoelectric layer which is arranged on a side of the vibration plate opposite to the pressure chambers to cover all of the plurality of pressure chambers as viewed from a direction orthogonal to the flat plane, a plurality of individual electrodes which are arranged on one surface of the piezoelectric layer corresponding to the plurality of pressure chambers respectively, and a common electrode which is arranged on the other surface of the piezoelectric layer, the method including the steps of: providing the channel unit; adhering the vibration plate to the partition wall sections of the channel unit; providing the piezoelectric layer to one surface of the vibration plate; and determining a thickness of the piezoelectric layer or a thickness of an adhesive layer between the vibration plate and the partition wall sections based on a parameter which is represented by $A=((Tv+Tp)^3\times(Ev+Ep)/2)/Wc^{1/2}w$ wherein a thickness of the vibration plate is Tv (mm), a coefficient of elasticity of the vibration plate is Ev ($kg/mm^2$), the thickness of the piezoelectric layer is Tp (mm), a coefficient of elasticity of the piezoelectric layer is Ep ($kg/mm^2$), and a length of each of the pressure chambers in a predetermined direction is Wc (mm).

In the method of manufacturing of the present invention, it is possible to determine in advance the thickness of the piezoelectric layer or the vibration plate in which the cross talk is reduced and a liquid transporting efficiency is improved by using the new parameter A discovered by the inventor of the present invention, and accordingly it is possible to manufacture the liquid transporting apparatus in which the fluctuation in the liquid transporting velocity, due to difference in the drive patterns of the pressure chamber, is suppressed sufficiently.

In the method of manufacturing of the present invention, the thickness of the adhesive layer between the vibration plate and the partition wall sections or the thickness of the piezoelectric layer may be determined such that values of A and B satisfy a relationship of $-0.03A-1200(1/B)+0.08>0$ wherein a length of each of the partition wall sections in the predetermined direction is Wa (mm), the thickness of the adhesive layer which is interposed between the partition wall sections and the vibration plate and which adheres the partition wall sections and the vibration plate is Ta (mm), a coefficient of elasticity of the adhesive layer is Ea (kg/mm2), and $B=Ea\times Wa/Ta$.

In a case where the thickness of the adhesive layer is determined such that the values of A and B satisfy the relationship of $-0.03A-1200(1/B)+0.08>0$, the method of manufacturing the liquid transporting apparatus may further include the steps of: measuring the thickness of the piezoelectric layer; and measuring the thickness of the vibration plate. In this case, after measuring the thickness Tv of the vibration plate and the thickness Tp of the piezoelectric layer, the vibration plate is joined to the channel unit in the joining step while adjusting the thickness Ta of the adhesive layer such that the above-mentioned relationship is satisfied by the values of A and B which are defined by the parameters of the piezoelectric actuator such as Tv, Tp, or the thickness Ta of the adhesive layer, thereby making it possible to suppress effectively the fluctuation in the transporting velocity due to the difference in the drive patterns, the fluctuation being caused due to the cross talk.

In the method of manufacturing of the present invention, the thickness of the adhesive layer may be adjusted such that the values of A and B satisfy a relationship of $-0.03A-700(1/B)+0.05>0$. In this case, it is possible to suppress even more effectively the fluctuation in the transporting velocity caused due to the cross talk.

In a case of determining the thickness of the piezoelectric layer such that the values of A and B satisfy the relationship of $-0.03A-1200(1/B)+0.08>0$, the method of manufacturing the liquid transporting apparatus may include the steps of: measuring the thickness of the vibration plate; and measuring the thickness of the adhesive layer. Thus, after measuring the thickness Tv of the vibration plate and the thickness Ta of the adhesive layer, the piezoelectric layer is formed in a piezoelectric forming step while adjusting the thickness Tp of the piezoelectric layer such that the above-mentioned relationship is satisfied by the values of A and B which are defined by the parameters of the piezoelectric actuator such as Tv, Ta, or the thickness Tp of the piezoelectric layer, thereby making it possible to suppress effectively the fluctuation in the transporting velocity due to the difference in the drive patterns, the fluctuation being caused due to the cross talk.

In the method of manufacturing of the present invention, the thickness Tp of the piezoelectric layer may be adjusted such that the values of A and B satisfy the relationship of $-0.03A-700(1/B)+0.5>0$. In this case, it is possible to suppress even more effectively the fluctuation in the transporting velocity caused due to the cross talk.

When the vibration plate is joined to the partition wall sections by the metallic diffusion joining, the thickness Tp of the piezoelectric layer may be determined to satisfy a relationship of $0.08>0.03\times((Tv+Tp)^3\times(Ev+Ep)/2)/Wc^{1/2}$. Moreover, the vibration plate may function as the common electrode. In this case, it is possible to reduce the number of components of the actuator.

DETAILED DESCRIPTION OF THE PREFERRED EMBODIMENTS

An embodiment of the present invention will be explained. This embodiment is an example in which the present invention is applied to an ink-jet head which discharges ink onto a recording paper from nozzles, as a liquid transporting apparatus.

Figure 1:
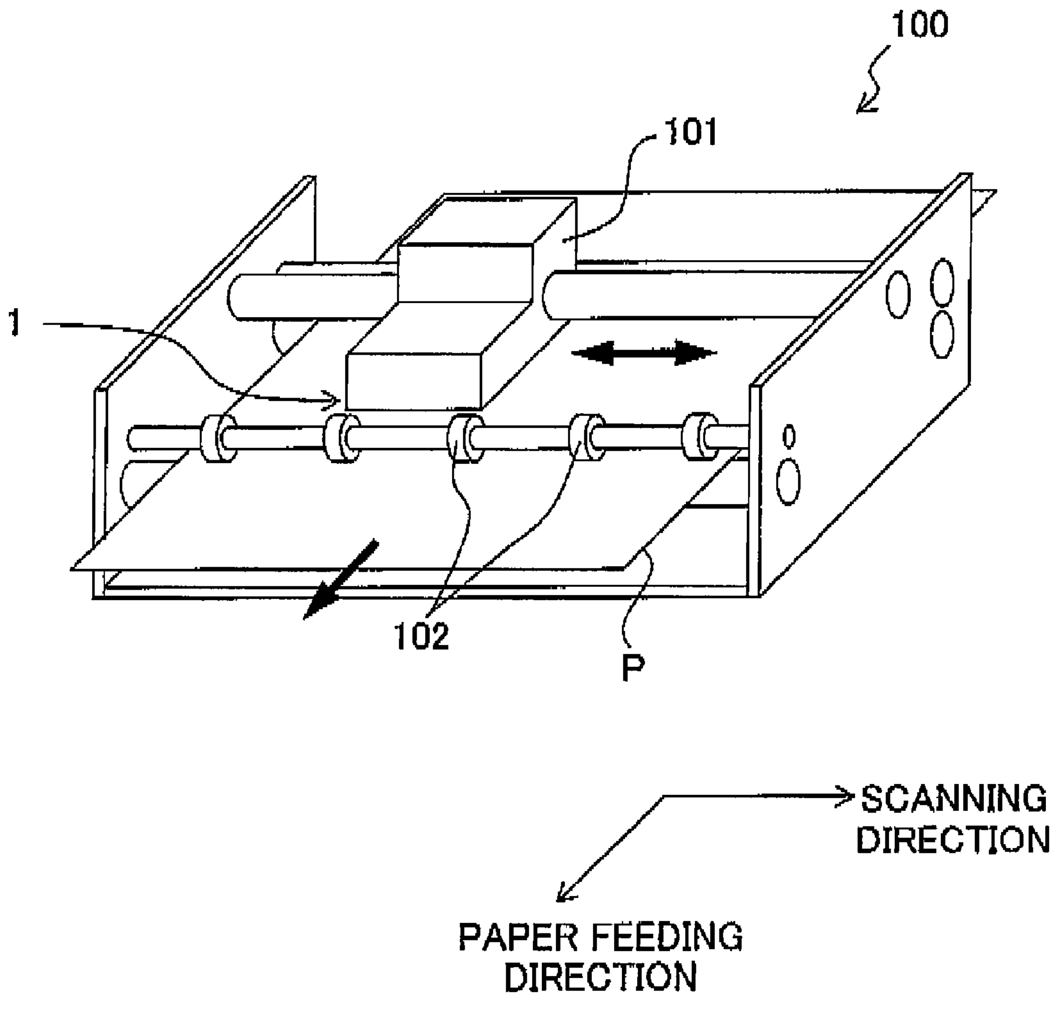
FIG. 1 is a schematic structural diagram of an ink-jet printer according to an embodiment of the present invention.

First of all, an ink-jet printer 100 which includes an ink-jet head 1 will be described briefly. As shown in FIG. 1, the ink-jet printer 100 includes a carriage 101 movable in a left and right direction, the ink-jet head 1 of serial type which is provided on the carriage 101 and discharges ink onto a recording paper P, and transporting rollers 102 which feed the recording paper P in a forward direction in FIG. 1. The ink-jet head 1 moves integrally with the carriage 101 in left and right direction (scanning direction) and discharges ink onto the recording paper P from ejecting ports of nozzles 20 (see FIGS. 2 to 5) formed in an ink-discharge surface of a lower surface of the ink-jet head 1. The recording paper P with an image recorded thereon by the ink-jet head 1 is discharged forward (paper feeding direction) by the transporting rollers 102.

Next, the ink-jet head 1 will be described in detail with reference to FIGS. 2 to 5. As shown in FIGS. 2 to 5, the ink-jet head 1 includes a channel unit 2 in which an individual ink channel 21 (see FIG. 4) including a pressure chamber 14 is formed in the inside of the ink channel, and a piezoelectric actuator 3 which is arranged on an upper surface of a channel unit 2.

Figure 4:
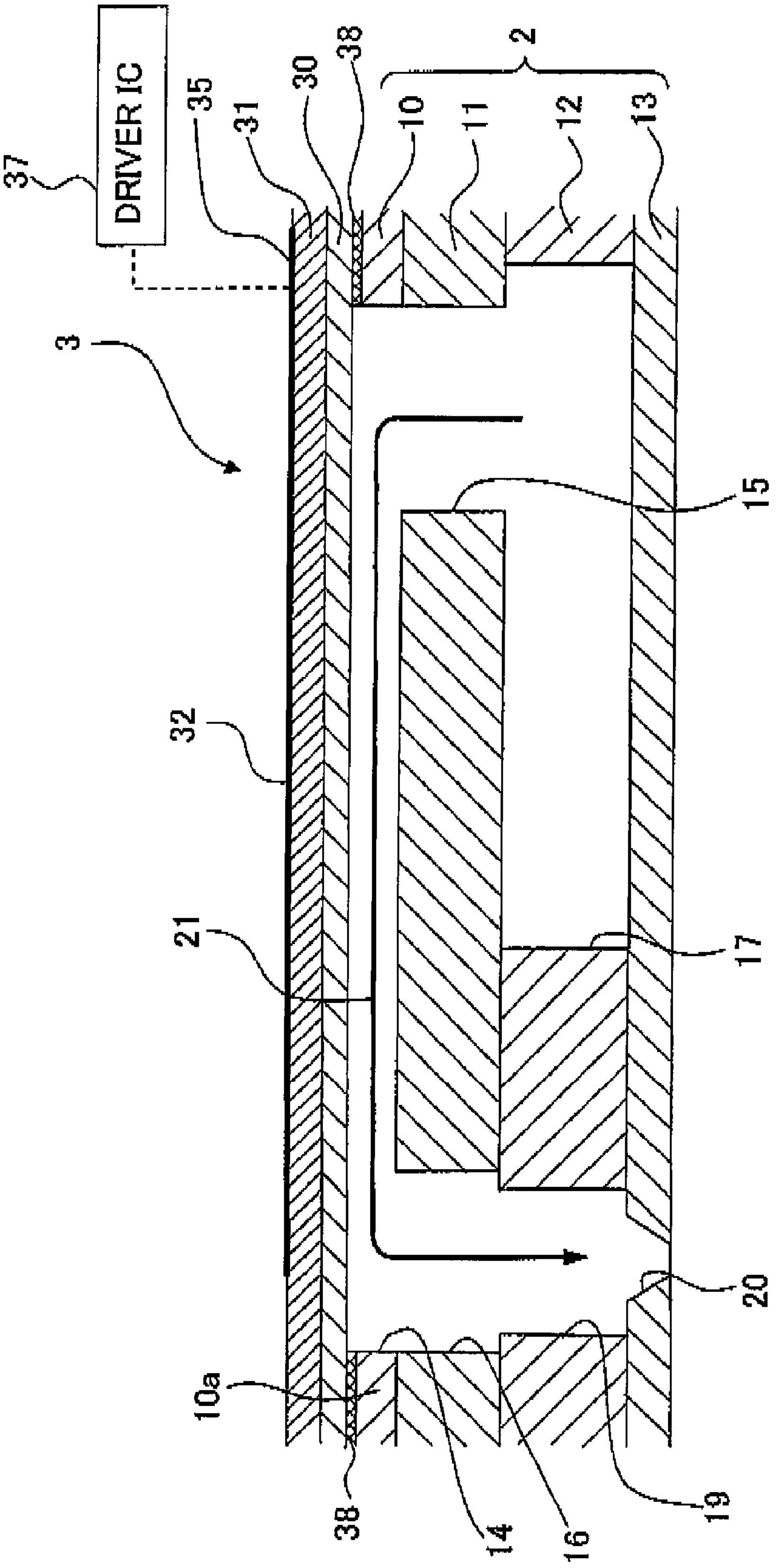
FIG. 4 is a cross-sectional view taken along a line IV-IV of FIG. 3.
Figure 5:
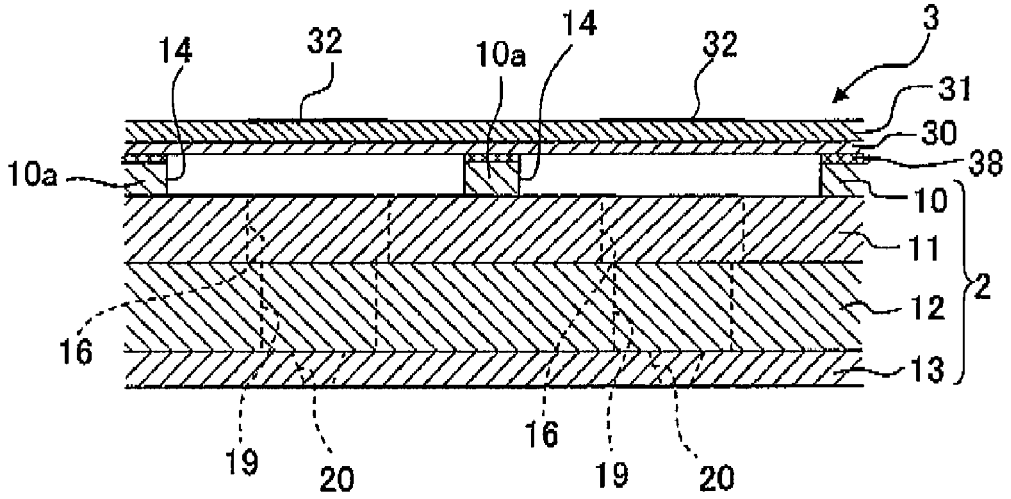
FIG. 5 is a cross-sectional view taken along a line V-V of FIG. 3.

The channel unit 2 will be described below. As shown in FIGS. 4 and 5, the channel unit 2 includes a cavity plate 10, a base plate 11, a manifold plate 12, and a nozzle plate 13, and these four plates 10 to 13 are joined in stacked layers. Among these four plates, the cavity plate 10, the base plate 11, and the manifold plate 12 are stainless steel plates, and an ink channel such as the pressure chamber 14 and a manifold 17 which will be described later, can be formed easily in these plates by etching. Moreover, the nozzle plate 13 is formed of a high-molecular synthetic resin material such as polyimide and is joined to a lower surface of the manifold plate 12. Alternatively, the nozzle plate 13 may also be formed of a metallic material such as stainless steel, similar to the three plates 10 to 12.

As shown in FIGS. 2 to 5, in the cavity plate 10, a plurality of pressure chambers 14 arranged along a flat plane are formed. These pressure chambers 14 are separated from each other by partition wall sections 10*a*. Moreover, the pressure chambers 14 are open on a side of a vibration plate 30 (an upper side in FIG. 4) which will be described later. Furthermore, the pressure chambers 14 are arranged in two rows in the paper feeding direction. Each of the pressure chambers 14 is substantially elliptical in a plan view and is arranged such that a long axis of the ellipse is in the scanning direction (left and right direction in FIG. 2). Moreover, an ink-supply port 18 which communicates with an ink tank which is not shown in the diagram is formed in the cavity plate 10.

Figure 2:
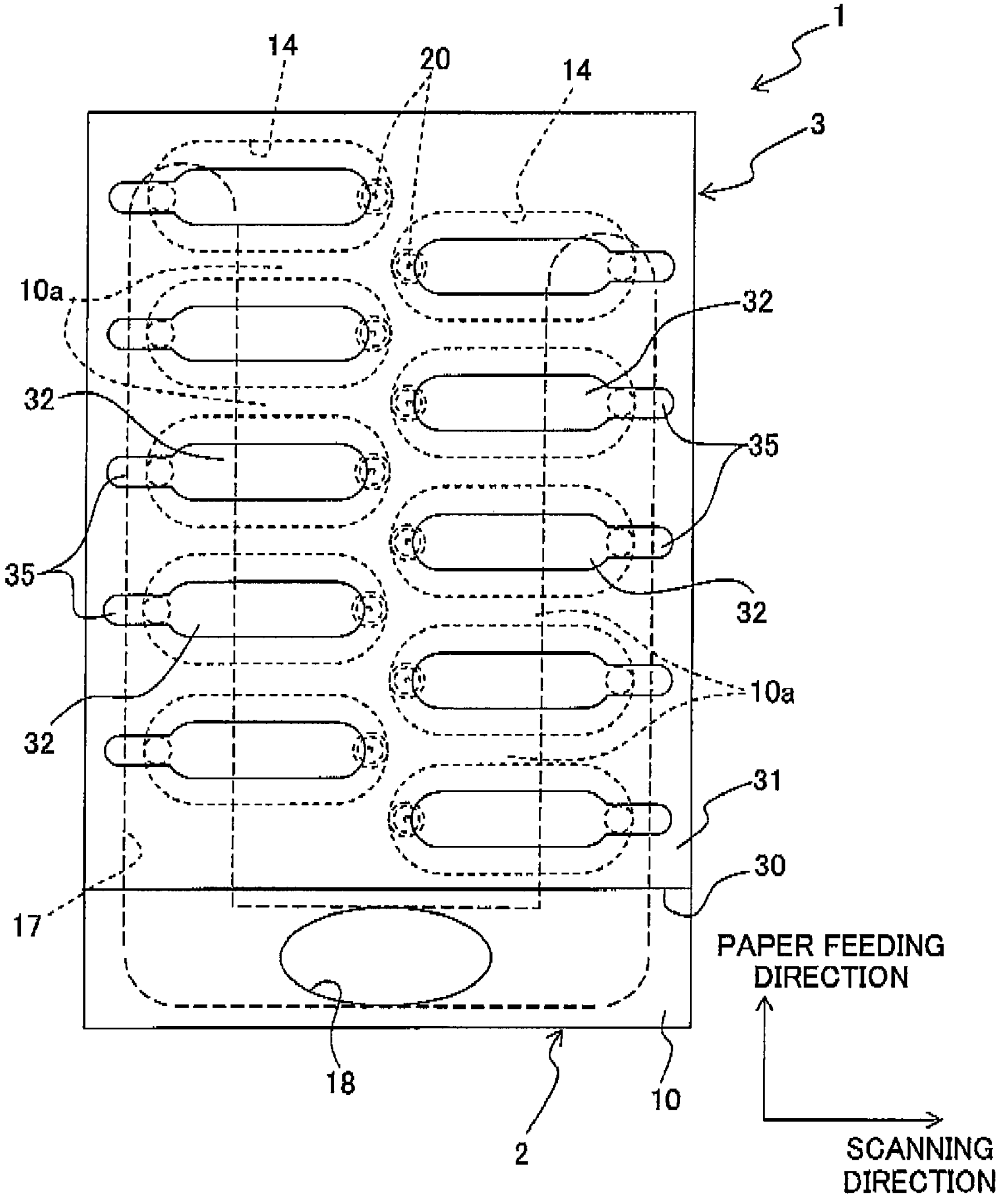
FIG. 2 is a plan view of an ink-jet head.
Figure 3:
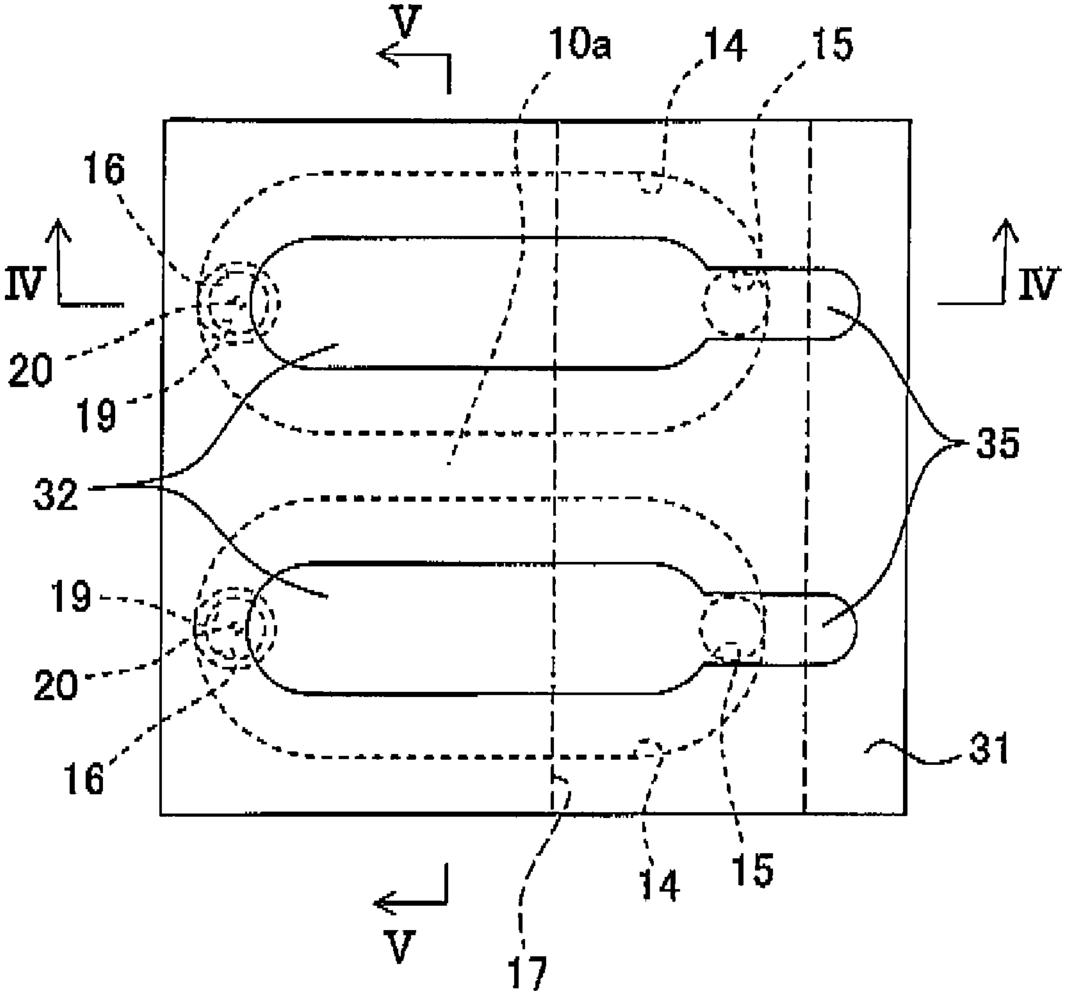
FIG. 3 is a partially enlarged view of FIG. 2.

As shown in FIG. 3 and FIG. 4, communicating holes 15 and 16 are formed in the base plate 11 at positions which overlap in a plan view with both end portions of the associated pressure chamber 14 in the long axis direction of the pressure chamber. Moreover, in the manifold plate 12, a manifold 17 is formed. The manifold 12 is extended in the paper feeding direction (vertical direction in FIG. 2) and overlaps with any one of left and right end portions of the pressure chambers 14 in a plan view in FIG. 2. Ink is supplied to the manifold 17 from the ink tank (not shown in the diagram) via the ink-supply port 18. Moreover, a communicating hole 19 is formed at a position which overlaps in a plan view with an end portion of each of the pressure chambers 14 on a side opposite to the manifold 17. Furthermore, a plurality of nozzles 20 is formed in the nozzle plate 13 at positions which overlap in a plan view with the communicating holes 19 respectively. The nozzles 20 are formed for example by means of an excimer laser process on a substrate of a high-molecular synthetic resin such as polyimide.

Further, as shown in FIG. 4, the manifold 17 communicates with the pressure chamber 14 via the communicating hole 15, and the pressure chamber 14 communicates with the nozzle 20 via the communicating holes 16 and 19. Thus, an individual ink channel 21 from the manifold 17 to the nozzle 20 via the pressure chamber 14 is formed in the channel unit 2.

Next, the piezoelectric actuator 3 will be described below. As shown in FIGS. 2 to 5, the piezoelectric actuator includes the vibration plate 30, a piezoelectric layer 31, and a plurality of individual electrodes 32. The vibration plate 30 which is electroconductive is arranged on an upper surface of the channel unit 2. The piezoelectric layer 31 is arranged on an upper surface (surface on a side opposite to the pressure chambers 14) of the vibration plate 30. The individual electrodes 32 are arranged on an upper surface of the piezoelectric layer 31 corresponding to the plurality of pressure chambers 14 respectively.

The vibration plate 30 is a plate having a substantially rectangular shape in a plan view and is made of a metallic material such as an iron alloy like stainless steel, a copper alloy, a nickel alloy, or a titanium alloy. The vibration plate 30 is arranged on an upper surface of the cavity plate 10 so as to cover the plurality of pressure chambers 14, and is adhered to the partition wall sections 10*a* of the cavity plate 10 by an adhesive layer 38. In this case, a material such as an epoxy-based adhesive and a wax material is used as an adhesive which forms the adhesive layer 38 interposing between the partition wall sections 10*a* and the vibration plate 30. Moreover, the vibration plate 30 also serves as a common electrode which faces the plurality of individual electrodes 32, and generates an electric field in the piezoelectric layer 31 between the individual electrodes 32 and the vibration plate 30.

The piezoelectric layer 31, which is composed of mainly lead zirconate titanate (PZT) which is a solid solution of lead titanate and lead zirconate, and is a ferroelectric substance, is arranged on an upper surface of the vibration plate 30. As shown in FIG. 2 and FIG. 5, the piezoelectric layer 31 is arranged entirely on an area which overlaps with the plurality of pressure chambers 14 and the partition wall sections 10*a* which separate the plurality of pressure chambers 14 (the piezoelectric layer 31 is arranged to cover all of the plurality of pressure chambers 14 and the partition wall sections 10 which separate the plurality of pressure chambers 14). In this case, the piezoelectric layer 31 can be formed, for example, by an aerosol deposition (AD) method in which very fine particles of a piezoelectric material are deposited by causing the particles to collide at a high speed by spraying on the substrate. Alternatively, the piezoelectric layer 31 can also be formed by a method such as a sputtering method, a chemical deposition method (CVD), a sol-gel method, or a hydrothermal synthesis method.

The plurality of individual electrodes 32 which are elliptical, flat and smaller in size to some extent than the pressure chamber 14 are formed on the upper surface of the piezoelectric layer 31. Each of the individual electrodes 32 is arranged at a position overlapping in a plan view with a central portion of the corresponding pressure chamber 14. The individual electrodes 32 are made of an electroconductive material such as gold, copper, silver, palladium, platinum, or titanium. Moreover, on the upper surface of the piezoelectric layer 31, a plurality of terminal sections 35 each extending in the scanning direction (left and right direction in FIG. 2) from an edge portion of one of the individual electrodes 32 on a side of the manifold 17 are also formed. The individual electrodes 32 and the terminal sections 35 can be formed by a method such as a screen printing, the sputtering method, or a deposition method. As shown in FIG. 4, the terminal sections 35 are electrically connected to a driver IC 37 via a wire member (not shown in the diagram) having flexibility such as a flexible printed circuit board, and drive voltage is selectively supplied from the driver IC 37 to the individual electrodes 32 via the terminal sections 35.

Figure 6:
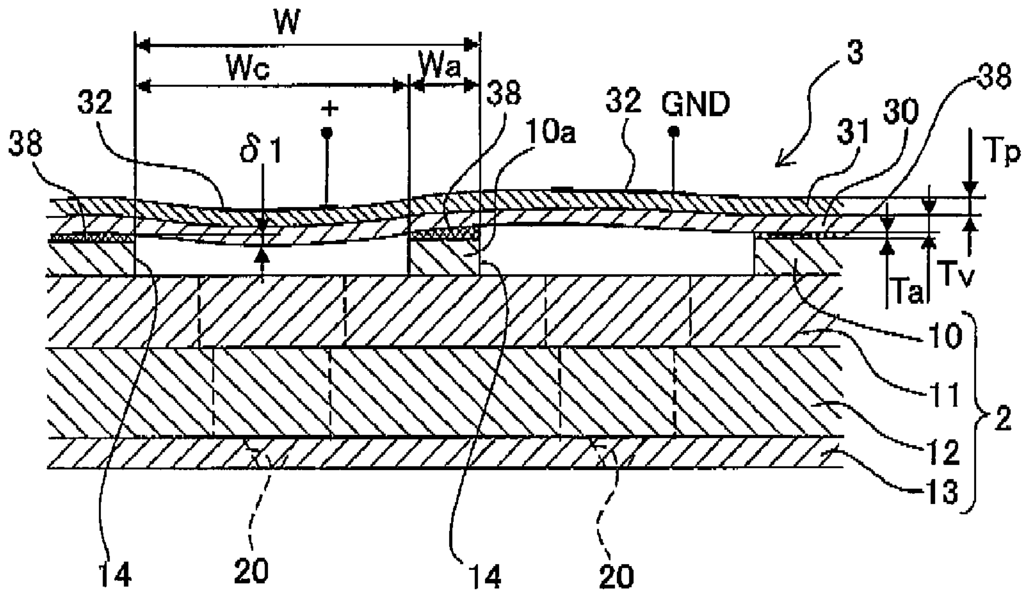
FIG. 6 is a diagram showing an operation of a piezoelectric actuator when a drive voltage is applied only to one individual electrode.

Next, an action of the piezoelectric actuator 3 will be described with reference to FIG. 6. In FIG. 6, "+" indicates a state in which a drive voltage is applied to the individual electrodes 32 and "GND" indicates a state in which the drive voltage is not applied to the individual electrodes 32 (the individual electrodes 32 are at ground potential).

When the drive voltage is selectively applied from the driver IC 37 to the individual electrodes 32, an electric potential of the individual electrodes 32 disposed on the upper side of the piezoelectric layer 31 to which the drive voltage is supplied, differs from an electric potential of the vibration plate 30 which is held at a ground potential, which serves as the common electrode and which is disposed on a lower side of the piezoelectric layer 31, and an electric field in a vertical direction is generated in a portion of the piezoelectric layer 31 sandwiched between the individual electrode 32 and the vibration plate 30. As the electric field is generated, the portion of the piezoelectric layer 31 directly below the individual electrodes 32 to which the drive voltage is applied contracts in a horizontal direction which is orthogonal to a vertical direction in which the piezoelectric layer 31 is polarized. At this time, since the vibration plate 30 is deformed due to the horizontal contraction of the piezoelectric layer 31 so as to project toward the pressure chamber 14, the volume inside the pressure chamber 14 is decreased and a pressure is applied on the ink in the pressure chamber 14, thereby discharging the ink from the nozzle 20 which communicates with the pressure chamber 14.

Figure 7:
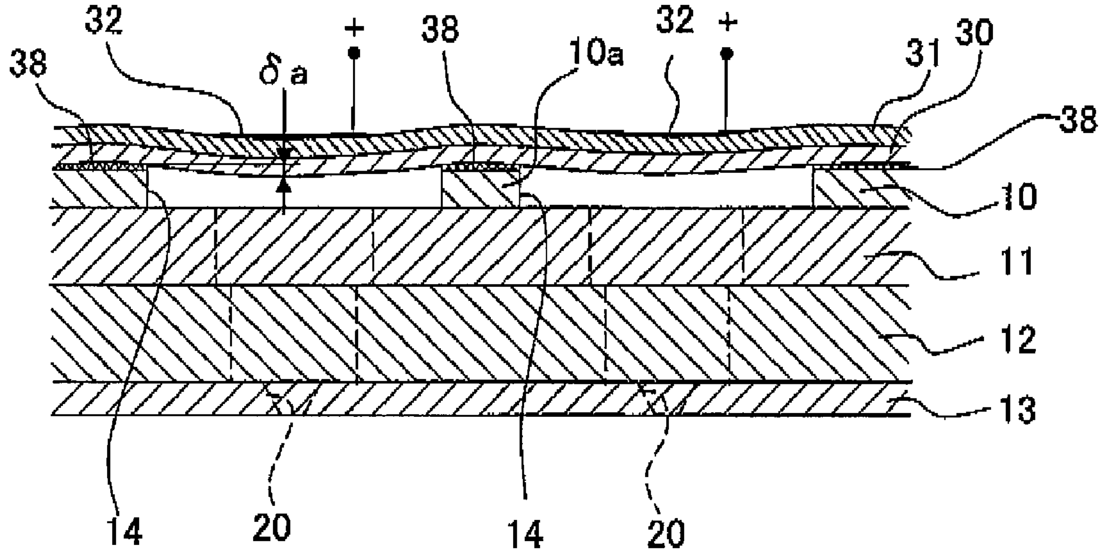
FIG. 7 is a diagram showing an operation of the piezoelectric actuator when the drive voltage is applied to all of the individual electrodes.

In the ink-jet head 1 of the present embodiment, as shown in FIG. 5, the piezoelectric layer 31 is arranged over an entire area on the upper surface of the vibration plate 30 overlapping with the plurality of pressure chambers 14 and the partition wall sections 10*a* which separate the plurality of pressure chambers 14. Therefore, when the drive voltage is applied to an individual electrode 32 corresponding to a certain pressure chamber 14, and when a portion of the piezoelectric layer 31 overlapping with that pressure chamber 14 is deformed, the deformation is propagated to a portion of the piezoelectric layer 31 on the partition wall sections 10*a*, and furthermore a so-called phenomenon of cross talk occurs in which the deformation is propagated to other portion of the piezoelectric layer 31 overlapping with another pressure chamber 14 adjacent to the certain pressure chamber 14. When the cross talk occurs, an amount of deformation of the vibration plate 30 changes due to difference in printing patterns (drive patterns of the pressure chambers 14). For example, a maximum amount of displacement δl of the vibration plate 30 when the drive voltage is applied to only one individual electrode 32 (an amount of deformation of a portion overlapping with a center of the pressure chamber 14; see FIG. 6) differs from a maximum amount of displacement δa when the drive voltage is applied simultaneously to the plurality of individual electrodes 32 (see FIG. 7). Therefore, a velocity of a droplet of ink discharged from the nozzles 20 fluctuates due to the difference in the printing patterns, thereby deteriorating a print quality.

In view of this, the ink-jet head 1 of the present embodiment is designed such that the fluctuation in the amount of deformation of the vibration plate 30 due to the difference in the printing patterns is as small as possible. Specifically, as shown in FIG. 6, when a thickness of the vibration plate 30 is Tv (mm), a coefficient of elasticity of the vibration plate is Ev ($kg/mm^2$), a thickness of the piezoelectric layer 31 is Tp (mm), a coefficient of elasticity of the piezoelectric layer 31 is Ep ($kg/mm^2$), a width of the pressure chamber 14 (a length in the paper feeding direction) is Wc (mm), a length of each of the partition wall sections 10*a* separating the plurality of pressure chambers 14 in a width direction of the pressure chamber 14 is Wa (mm), a thickness of the adhesive layer 38 (an adhesive) interposed between the vibration plate 30 and the partition wall sections 10*a* of the channel unit 2 is Ta (mm), and a coefficient of elasticity of the adhesive layer 38 is Ea ($kg/mm^2$), each value of these parameters (Tv, Ev, Tp, Ep, Wc, Wa, Ta, and Ea) of the piezoelectric actuator 3 is determined such that a predetermined relationship is satisfied.

Further, the relationship which is to be satisfied by the parameters of the piezoelectric actuator 3 is determined as follows. First of all two parameters A and B are defined respectively as $A=((Tv+Tp)^3\times(Ev+Ep)/2)/Wc^{1/2}$, and $B=Ea\times Wa/Ta$. Here, A is a coefficient representing a bending stiffness of the vibration plate 30 and the piezoelectric layer 31 (proportional to a cube of the thickness and to the coefficient of elasticity). On the other hand, B is a coefficient of tension and compression of the adhesive layer 38 interposed between the partition wall sections 10*a* and the vibration plate 30. According to the research conducted by the inventor of the present invention, it was discovered that by using the parameter represented by A mentioned above, it is possible to determine generally the thickness of the piezoelectric layer or the thickness of the vibration plate which is capable of reducing the cross talk even in various actuators having a various distance between the pressure chambers (or distance between the partition wall sections). In theory, the stiffness of the actuator portion is considered to be proportional to $((Tv+Tp)^3\times(Ev+Ep)/2)/Wc^{1/3}$. However, according to the experiments performed by the inventor, the inventor successfully determined, by using $1/Wc^{1/2}$ rather than $1/Wc^{1/3}$, the thickness of the piezoelectric layer or the thickness of the vibration plate which is capable of reducing the cross talk and reducing the fluctuation in the liquid transporting velocity, and which can be applied to various actuators having various width Wc of pressure chambers as shown below.

Furthermore, regarding three cases (case 1 to case 3) having mutually different width Wc of the pressure chambers 14, a structure analysis was carried out by a finite element method (FEM) for a situation where the drive voltage is applied to only one individual electrode 32, and a situation where the drive voltage is applied at the same time to all of the individual electrodes 32. This condition for analysis is indicated in Table 1. Further, case 1 to case 3 correspond to ink-jet heads in which the nozzles 20 are arranged at distances 75 dpi, 50 dpi, and 37.5 dpi in the paper feeding direction, respectively.

TABLE 1

| Analysis case | Wc (mm) | Wa (mm) | Tv (mm) | Tp (mm) | Ta (μm) | Ev ($kg/mm^2$) | Ep ($kg/mm^2$) | Ea ($kg/mm^2$) |
|---|---|---|---|---|---|---|---|---|
| Case 1 | 0.250 | 0.89 | 0.020-0.030 | 0.005-0.020 | 0-0.002 | 20000 | 7000 | 700 |
| Case 2 | 0.419 | 0.89 | 0.020-0.030 | 0.005-0.020 | 0-0.002 | 20000 | 7000 | 700 |
| Case 3 | 0.677 | 0.89 | 0.020-0.030 | 0.005-0.020 | 0-0.002 | 20000 | 7000 | 700 |

Figure 8:
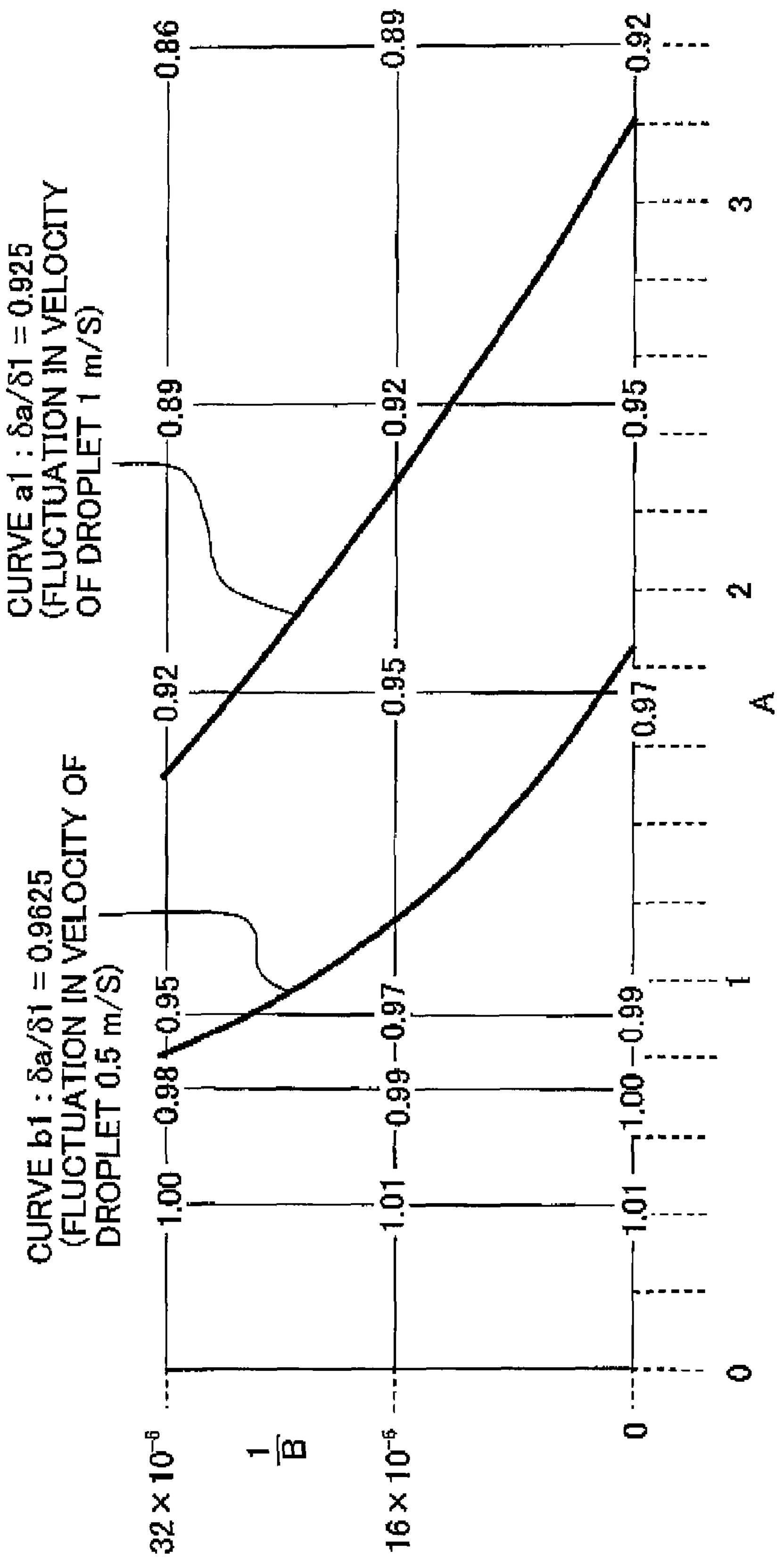
FIG. 8 is a graph showing an analysis result of case 1.
Figure 9:
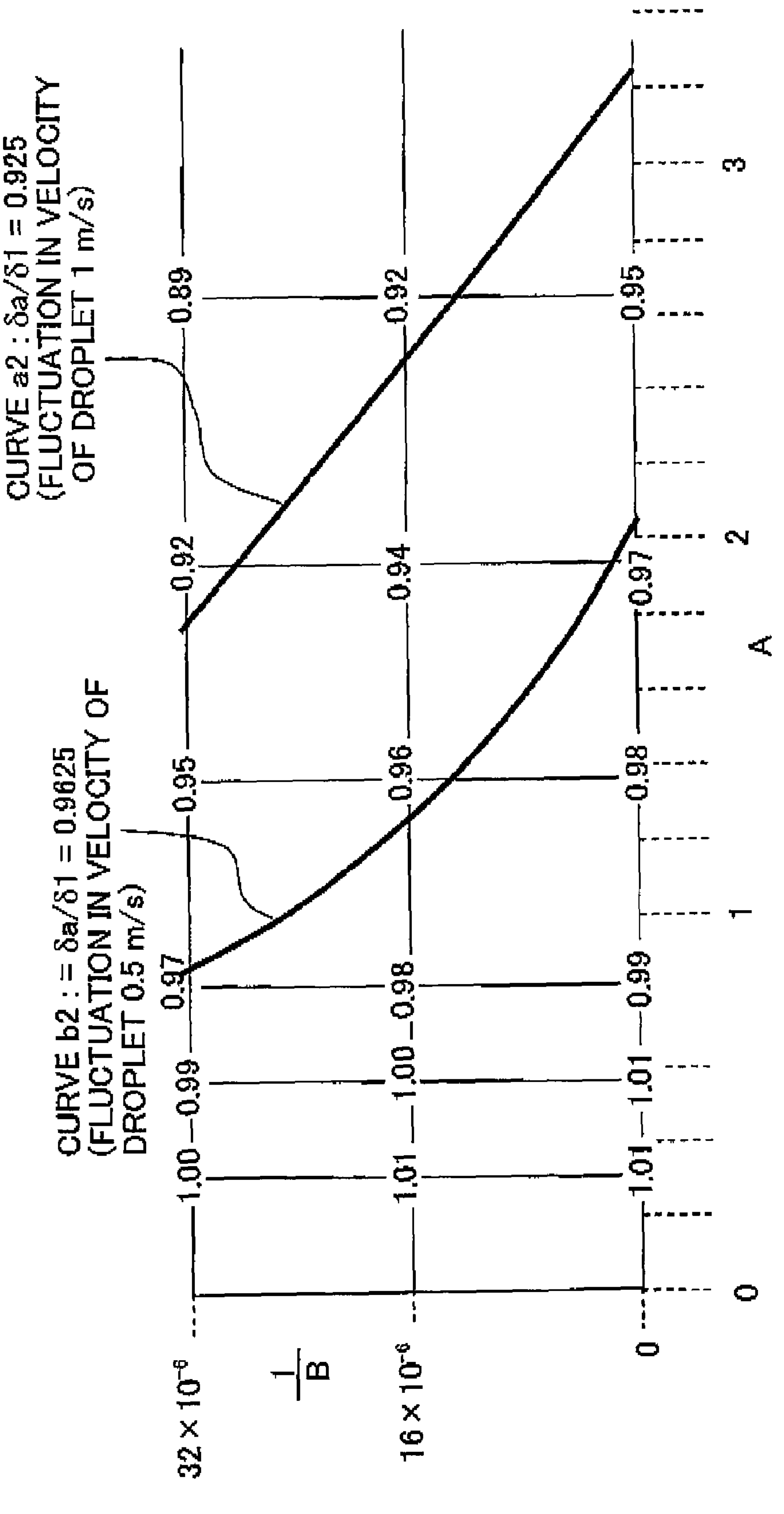
FIG. 9 is a graph showing an analysis result of case 2.
Figure 10:
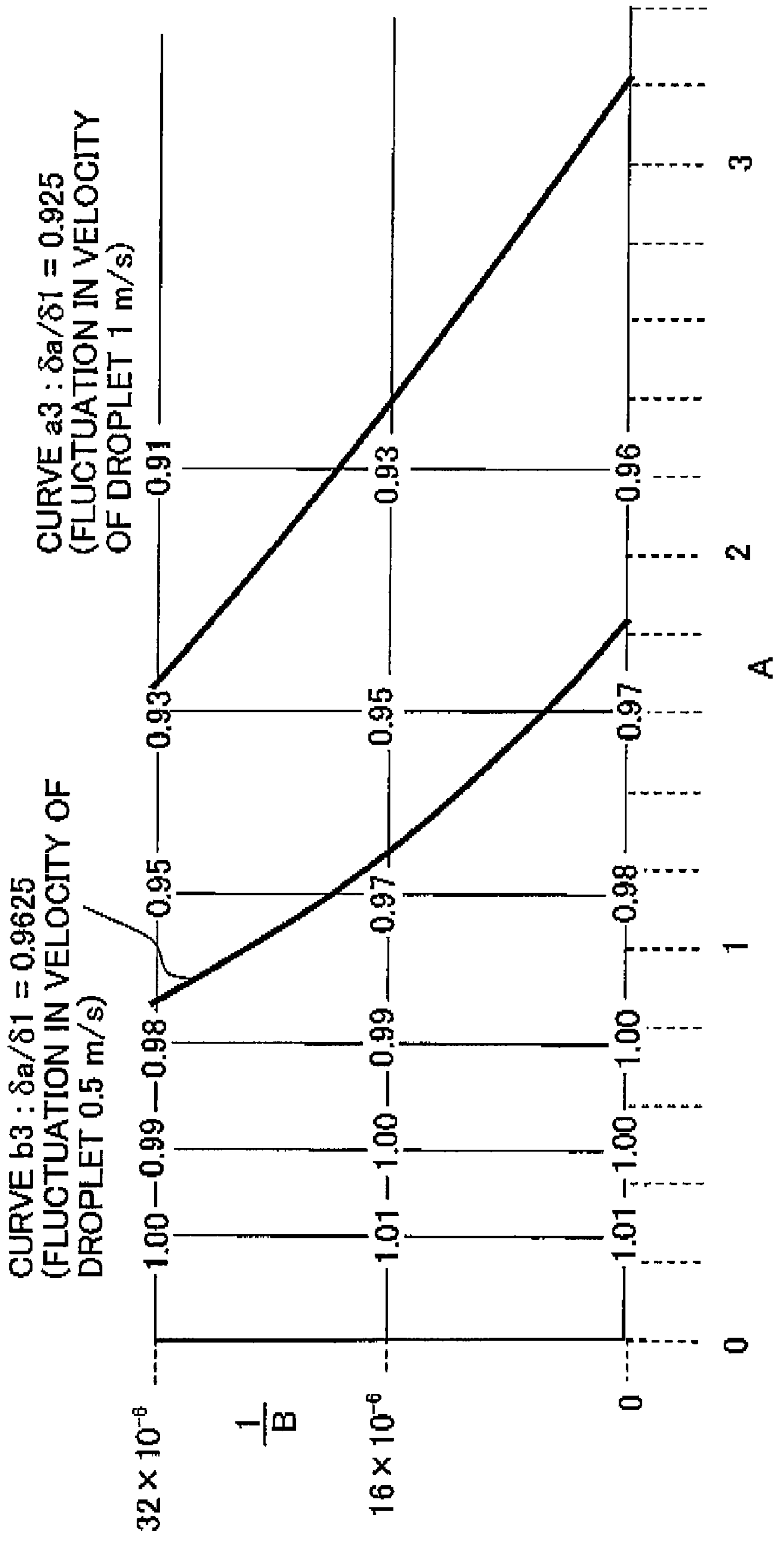
FIG. 10 is a graph showing an analysis result of case 3.

An analysis result for each of the three cases 1 to 3 is shown in FIGS. 8 to 10. In this case, in FIGS. 8 to 10, a value in the graph is a value δa/δl which is a proportion, at a point (A, 1/B), of a maximum amount of displacement 61 of the vibration plate 30 when the drive voltage is applied only to one individual electrode 32, and a maximum amount of displacement δa of the vibration plate 30 when the drive voltage is applied to all of the individual electrodes 32. As to how δa/δl changes according to a change in A and/or 1/B, is revealed from the point (A, 1/B) after the change. Further, as shown in FIGS. 8 to 10, it is appreciated that, as the value of A indicating the bending stiffness of the vibration plate 30 and the piezoelectric layer 31 is smaller (as the vibration plate 30 and the piezoelectric layer tend to be bent more easily), and as the value of 1/B which is a reciprocal of the coefficient of tension and compression B of the adhesive layer 38 is smaller (as the stiffness of the adhesive layer 38 is higher), the value of δa/δl becomes closer to 1 and the fluctuation in the maximum amount of displacement of the vibration plate 30 due to the difference in the printing patterns becomes smaller. Moreover, as shown in FIGS. 8 to 10, the relationship between A and B, and δa/δl almost coincide for the three cases (case 1 to case 3). From this result, it is appreciated that the new parameter A introduced by the inventor brings a universal result for a desirable range of δa/δl for different width Wc of the pressure chambers. In other words, by using the parameter A, even in designing of an actuator having a different width we of the pressure chambers, it is possible to determine a generalized condition for reducing the cross talk.

Figure 11:
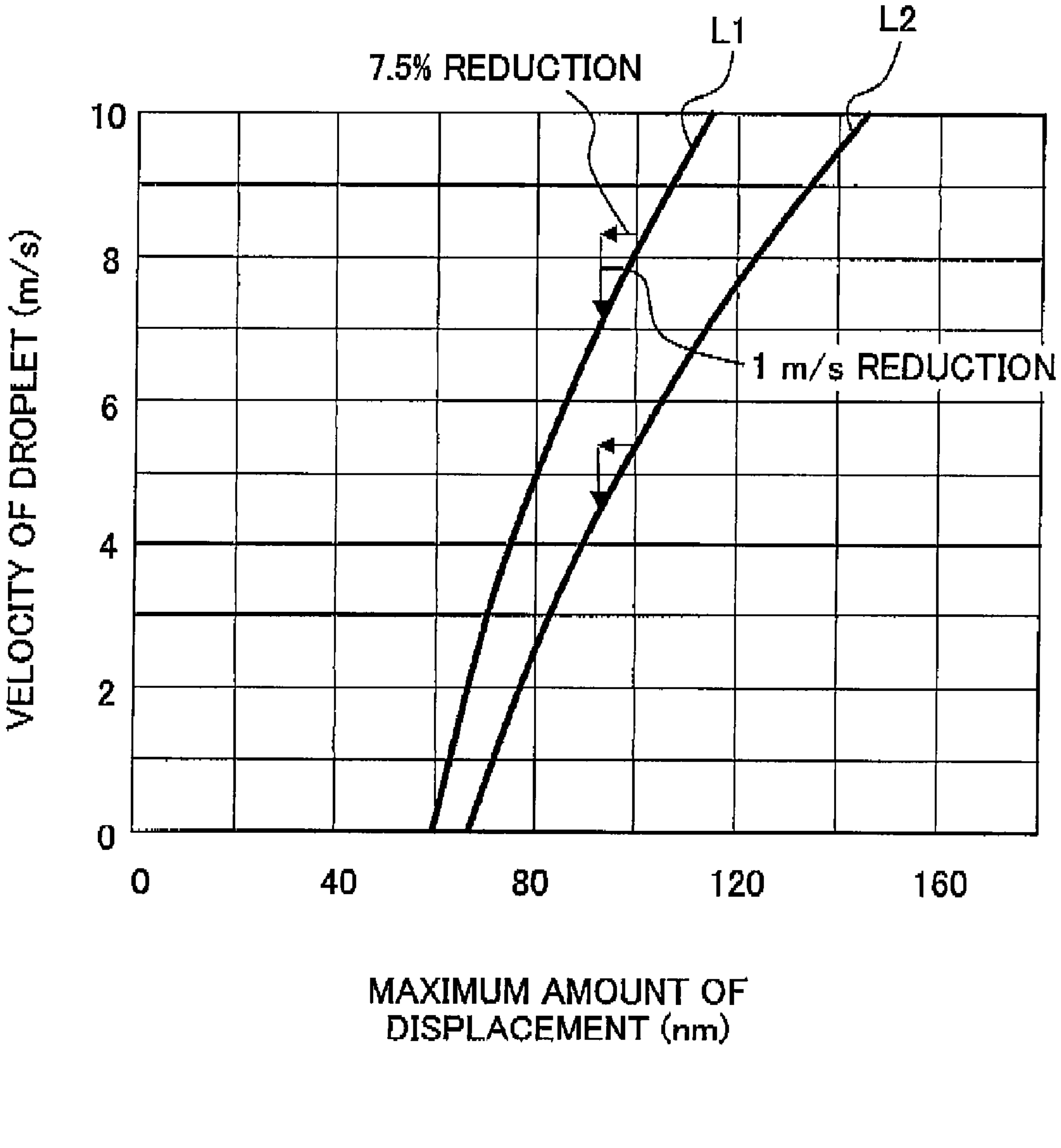
FIG. 11 is a graph showing a relationship between a maximum amount of displacement of the vibration plate and a velocity of an ink droplet.

When the maximum amount of displacement of the vibration plate fluctuates due to the difference in the printing patterns, the velocity of ink droplet discharged from the nozzle 20 is fluctuated. In this case, there is an empirical rule discovered by the inventor between the amount of displacement of the vibration plate 30 and the velocity of the ink droplet discharged from the nozzle 20. According to the empirical rule, as shown in FIG. 11, when the amount of displacement of the vibration plate 30 is reduced by 7.5%, the velocity of droplet is reduced by 1 m/s. In piezoelectric actuators 3 of different types, although curves showing the relationship between the amount of displacement of the vibration plate 30 and the velocity of droplet are different as curve L1 and curve L2 in FIG. 11, this empirical rule itself holds for any type of piezoelectric actuator. In view of this, considering the fluctuation in the velocity of the ink droplet, the range of δa/δl which is an acceptable maximum amount of displacement, is determined as follows.

Figure 12:
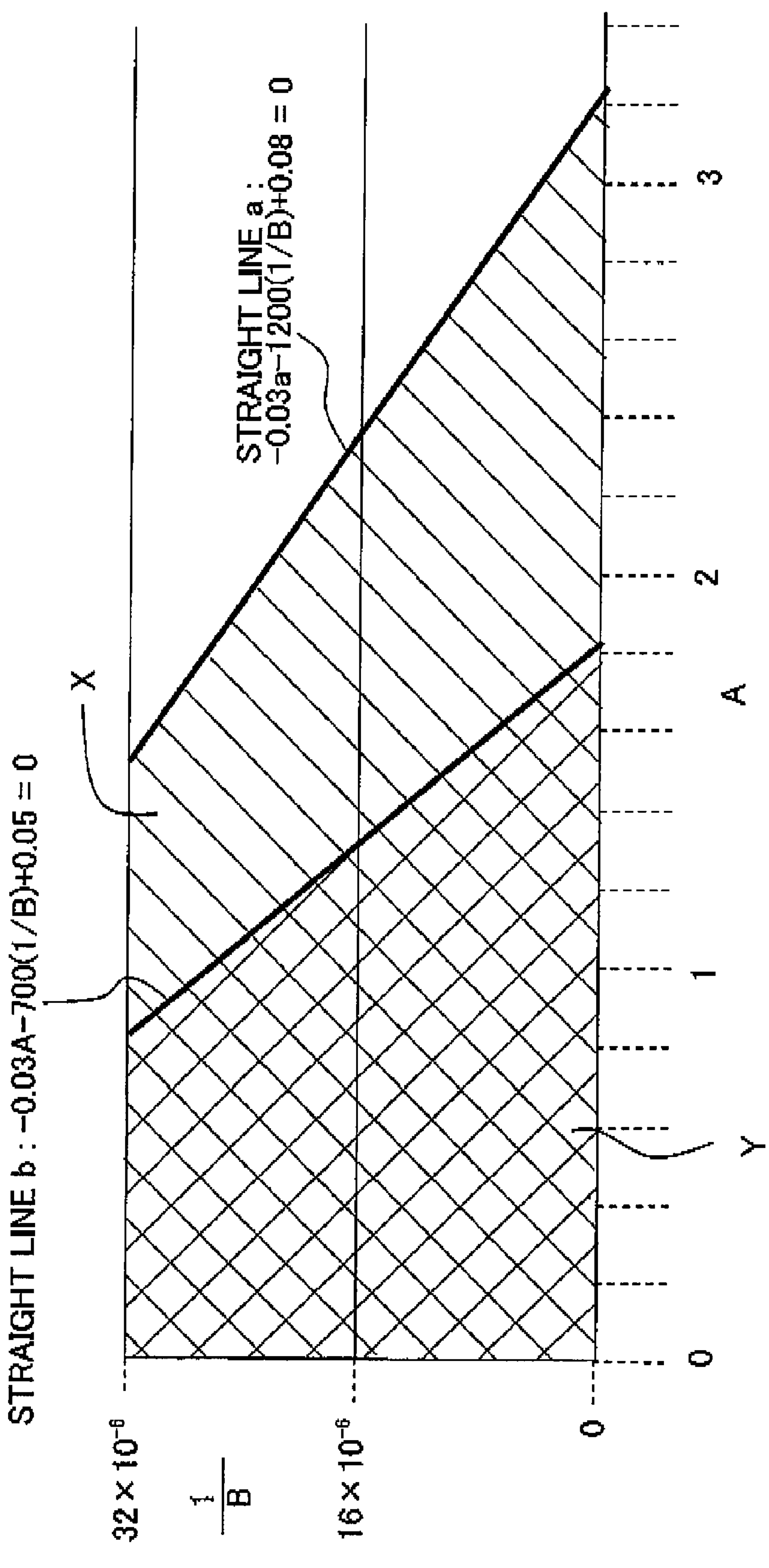
FIG. 12 is a graph in which a relationship between the A and B and a ratio of δa/δl of the maximum amount of displacement when the fluctuation in the velocity of the droplet becomes not more than 1 m/s or not more than 0.5, is approximated by a straight line.

In order to maintain a good print quality, it is desirable that the fluctuation in the velocity of droplet is suppressed to be not more than 1 m/s. For this purpose, from the relationship shown in FIG. 11, it is necessary to make the fluctuation in the maximum amount of displacement of the vibration plate 30 to be not more than 7.5%, i.e. to make the value of δa/δl to be not less than 0.925(=1−0.075). In view of this, in analysis results in FIGS. 8 to 11, when a line for which δa/δl=0.925 is drawn, the line is like curves a1, a2, and a3 and in order to suppress the fluctuation in the velocity of droplet within 1 m/s, it is necessary to determine the values of A and B in an area on a left side from the curves a1 to a3. In this case, the curves a1 to a3 almost coincide with each other and moreover, since there is no point of inflection, it is possible to approximate the three curves a1 to a3 by one straight line "a". Accordingly, as shown in FIG. 12, this approximate straight line "a" is −0.03A−1200 (1/B)+0.08=0. Therefore, to make the fluctuation in the velocity of droplet to be not more than 1 m/s, parameters (Tv, Ev, Tp, Ep, Wc, Wa, Ta, and Ea) of the piezoelectric actuator 3 such as the thickness and the material of the vibration plate 30, the piezoelectric layer 31, or the adhesive layer 38 may be determined such that the values of A and B fall within in an area X (−0.03A−1200(1/B)+0.08>0) on the left side from the straight line "a". Thus, since the curves a1 to a3 almost coincide, it is appreciated that the new parameter A introduced by the inventor is a proper parameter for selecting the thickness of the piezoelectric layer or the thickness of the joining layer for reducing the cross talk by generalization.

Moreover, to maintain even better print quality, it is desirable to suppress the fluctuation in the velocity of droplet to be not more than 0.5 m/s. In this case, from the relationship between the velocity of droplet and the maximum amount of displacement in FIG. 11, it is necessary to make the fluctuation in the maximum amount of displacement of the vibration plate 30 to be not more than 3.75%, i.e. to make the value of δa/δl to be not less than 0.9625. In view of this, in the analysis results shown in FIGS. 8 to 11, when a line in which δa/δl=0.9625 is drawn, the line is like curves b1, b2, and b3. These curves almost coincide, and since there is no point of inflection, it is possible to approximate these three curves b1 to b3 by one straight line "b", and as shown in FIG. 12, this approximate straight line "b" is −0.03A−700(1/B)+0.05=0. Therefore, to make the fluctuation in the velocity of droplet to be not more than 0.5 m/s, the parameters (Tv, Ev, Tp, Ep, Wc, Wa, Ta, and Ea) of the piezoelectric actuator 3 may be determined such that the values of A and B fall within in an area Y (−0.03A−700(1+B)+0.05>0) on the left side from the straight line "b".

Figure 13:
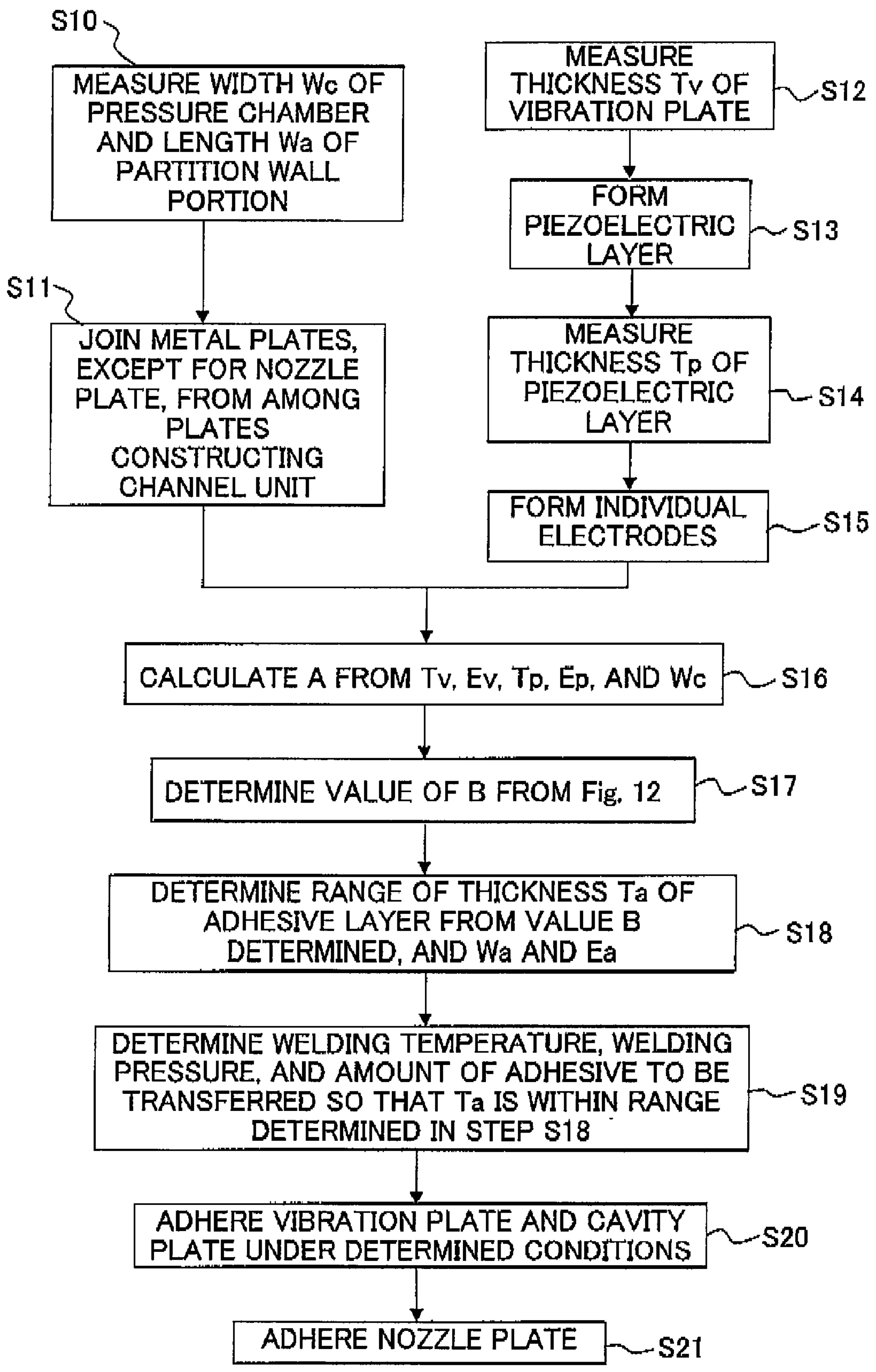
FIG. 13 is a flow chart of a manufacturing process of the ink-jet head.

Next, a method of manufacturing the ink-jet head 1 will be described with reference to FIG. 13. In FIG. 13, Si (i=10, 11, 12 . . . ) indicates each of steps.

First of all, a hole defining the individual ink channel 21 (see FIG. 4) is formed in the plates 10 to 13 constructing the channel unit 2. Then, the width Wc of the pressure chamber 14 arranged on the cavity plate 10 and the length Wa of the partition wall section 10*a* in the width direction of the pressure chamber 14 are measured (step S10). In this case, the width Wc of the pressure chamber 14 and the length Wa of the partition wall section 10*a* can be obtained, for example, by photographing flatly the partition wall section 10*a*, and performing image processing on this data. Moreover, Wc and Wa need not be necessarily measured for each of the pressure chambers 14, and may be measured for some of the pressure chambers 14 for example, and may be represented by an average of measured values. Next, among the plates 10 to 13 constructing the channel unit 2, except for the nozzle plate 13, the cavity plate 10, the base plate 11, and the manifold plate 12, each of which is formed of a metallic material, are joined by a metallic diffusion joining in which the plates are pressurized upon heating up to a temperature of not less than a predetermined temperature (about 1000° C., for example) (step S11).

On the other hand, the thickness Tv of the vibration plate 30 is measured by using a measuring instrument such as a laser displacement gauge (step of measuring the thickness of the vibration plate: S12). Next, after depositing the particles of a piezoelectric material by using a method such as the AD method, the sputtering method, the CVD method, the sol-gel method, or the hydrothermal synthesis method, a heat treatment for making the layer dense is performed to form the piezoelectric layer 31 (step of forming the piezoelectric layer: S13). Then, the thickness Tp of the piezoelectric layer 31 is measured by a measuring instrument such as the laser displacement gauge (step of measuring the thickness of the piezoelectric layer: S14). Furthermore, individual electrodes 32 are formed on a surface of the piezoelectric layer on a side opposite to the pressure chambers 14 by a method such as the screen printing, the sputtering method, or the vapor deposition method (step S15).

Further, A $(=((Tv+Tp)^3\times(Ev+Ep)/2)/Wc^{1/2})$ is calculated from the thickness Tv of the vibration plate 30, the coefficient of elasticity Ev of the vibration plate 30, the thickness Tp of the piezoelectric layer 31, the coefficient of elasticity Ep of the piezoelectric layer 31, and the width Wc of the pressure chamber 14 (step S16). A value of B corresponding to this value of A is determined within the range of the area X in FIG. 12 (desirably within the area Y) (step S17). Furthermore, a range of the thickness Ta of the adhesive layer 38 is determined from the determined value of B (=Ea×Wa/Ta), the length Wa of the partition wall section 10*a* in the width direction, and the coefficient of elasticity Ea of the adhesive which is used for adhering the vibration plate 30 and the cavity plate 10 (step S18).

Further, an amount of adhesive to be transferred, a welding pressure, and a welding temperature required for the thickness Ta of the adhesive layer 38 to be within the determined range are calculated (step S19) and the vibration plate 30 and the cavity plate 10 are adhered under the determined conditions (joining step: S20). Finally, the nozzle plate 13 is adhered to the manifold plate 12 (step S21) and the process of manufacturing the ink-jet head is completed.

When the nozzle plate 13 is made of a metal similar to the cavity plate 10, the base plate 11, and the manifold plate 12, these four metal plates 10 to 13 may be joined at the same time by a method such as the metallic diffusion joining.

The following effects can be achieved by the ink-jet head 1 and the method of manufacturing the ink-jet head.

Since the values of A and B which are defined by the parameters of the piezoelectric actuator such as the thickness Tv of the vibration plate 30, the thickness Tp of the piezoelectric layer 31, and the thickness Ta of the adhesive layer 38, are determined so as to satisfy a predetermined relationship in which the fluctuation in the velocity of droplet due to the difference in the print patterns becomes smaller, it is possible to prevent the deterioration of print quality due to the cross talk. Moreover, the fluctuation in the velocity of droplet can be suppressed assuredly without performing any special process such as recessing on the vibration plate 30 and the piezoelectric layer 31.

Moreover, after measuring the thickness TV of the vibration plate 30 and the thickness Tp of the piezoelectric layer 31, the vibration plate 30 is joined to the channel unit 2 while adjusting the thickness Ta of the adhesive layer 38 such that the values of A and B defined by the parameters of the piezoelectric actuator 3 such as Tv and Tp, or the thickness Ta of the adhesive layer 38 satisfy the predetermined relationship as mentioned above, thereby making it possible to suppress effectively the fluctuation in the velocity of droplet due to the difference in the print patterns.

Next, modified embodiments in which various modification are made in the embodiment mentioned above will be described. Same reference numerals will be used for components which have a structure similar to the structure in the embodiment described above and the description is omitted to avoid repetition.

First Modified Embodiment

In the method of manufacturing the ink-jet head 1 according to the embodiment described above (see FIG. 13) after determining the value of B in step S17, the thickness Ta of the adhesive layer 38 is determined in step S18 from the value of B and the value of the coefficient of elasticity Ea of the adhesive layer 38. Conversely, the thickness Ta of the adhesive layer 38 may be determined in advance, and then a range of the coefficient of elasticity Ea of the adhesive layer 38 may be determined from the value of B and the value of Ta, and an usable adhesive may be selected accordingly.

Second Modified Embodiment

Figure 14:
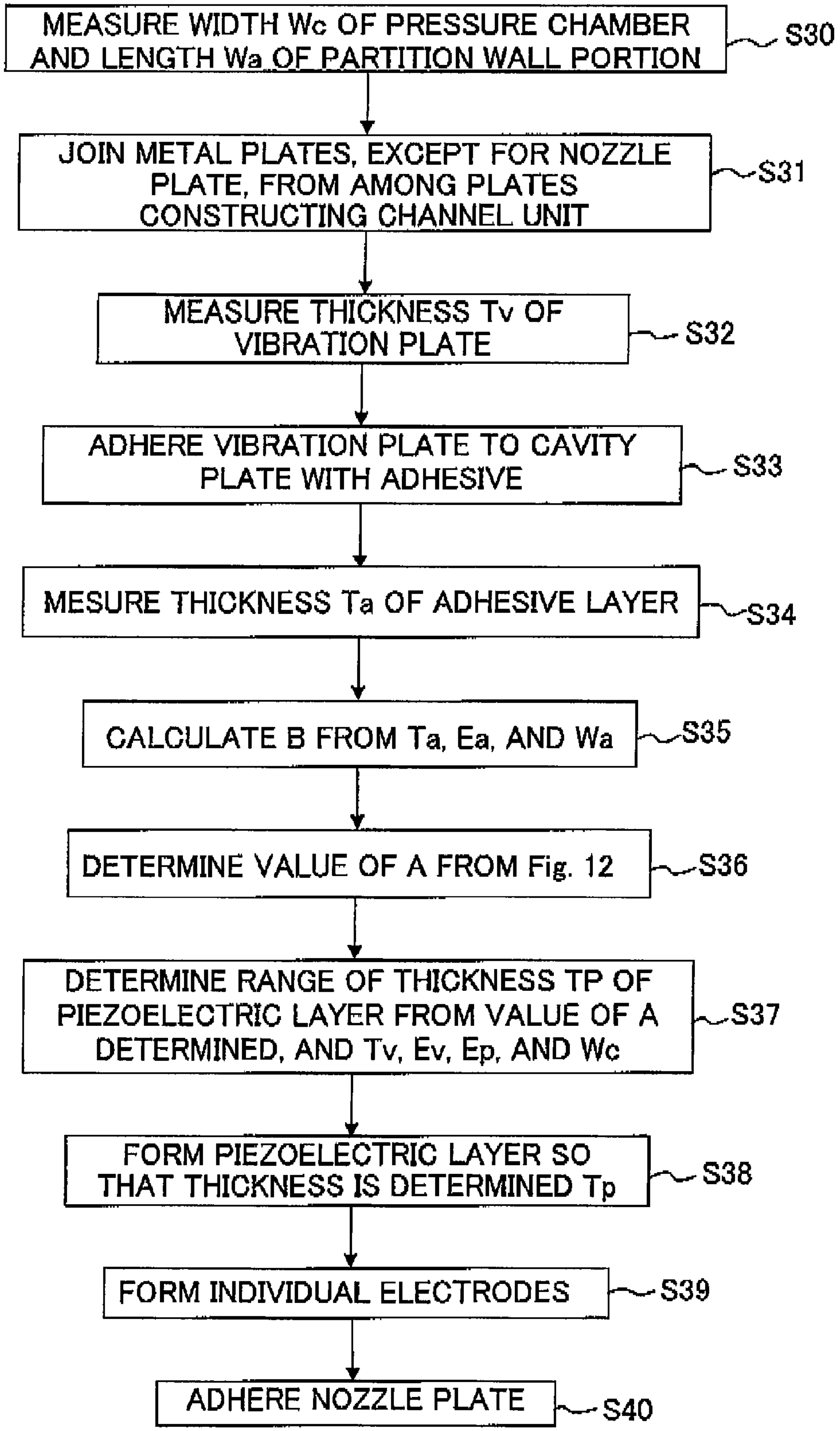
FIG. 14 is a flow chart of a manufacturing process of an ink-jet head of a second modified embodiment.

In the method of manufacturing the ink-jet head 1 according to the embodiment described above (see FIG. 13), after forming the piezoelectric layer 31 on one surface of the vibration plate 30 (step S13), the vibration plate 30 is adhered to the cavity plate 10 (step S20). However, the piezoelectric layer 31 may be formed on the vibration plate 30 after adhering the vibration plate 30 to the cavity plate 10. In this case, for example, as shown in FIG. 14, the width Wc of the pressure chamber 14 and the length Wa of the partition wall section 10*a* in the width direction of the pressure chamber 14 are measured (step S30); then the metal plates 10 to 12 excluding the nozzle plate 13 are joined (step S31); then the thickness Tv of the vibration plate 30 is measured (step of measuring the thickness of the vibration plate: S32); and then the vibration plate 30 is adhered to the cavity plate 10 by an adhesive (step of adhering: S33). In the second modified embodiment, since the piezoelectric layer 31 is formed after adhering the vibration plate 30 to the cavity plate 10, it is necessary to use, as an adhesive for adhering the vibration plate 30 and the cavity plate 10, an adhesive such as a wax material having a heat-resistant temperature higher than a heat treatment temperature of the piezoelectric layer 31.

Next, the thickness Ta of the adhesive layer 38 is measured by a method such as the following method (step of measuring thickness of the adhesive layer: S34). For example, after forming a layer of the adhesive material having a uniform thickness on a substrate, one of the cavity plate 10 and the vibration plate 30 is pressed against the substrate. As one of the plates 10 and 30 is pressed, the adhesive is transferred to one of the plates 10 and 30 and there is a difference in levels of the adhesive on the substrate. Therefore, by measuring the difference in levels by the laser displacement gauge, it is possible to obtain the thickness of the adhesive transferred to one of the plates 10 and 30. Further, one of the plates 10 and 30, to which the adhesive has been transferred, is stacked to the other of the plates 10 and 30 to be pressurized while being heated, thereby curing the adhesive interposed between the two plates 10 and 30. In this case, since there is a certain predetermined correlation between the thickness of the adhesive transferred to one of the plates and the thickness of the adhesive in the cured state, it is possible to obtain the thickness of the adhesive between the two plates 10 and 30 (namely, thickness Ta of the adhesive layer 38) based on the correlation and the thickness of the adhesive layer after the transfer.

Alternatively, the thickness of the vibration plate 30 and the thickness of the cavity plate 10 may be respectively measured in advance by the laser displacement gauge, and further, after adhering the vibration plate 30 and the cavity plate 10, a total thickness of the two plates 10 and 30 after the adhesion may be measured, and the thickness Ta of the adhesive layer 38 interposed between the vibration plate 30, and the cavity plate 10 may be calculated from the total thickness of the two plates 10 and 30 and the thickness of each of the two plates 10 and 30.

Further, B (=Ea×Wa/Ta) is calculated from the thickness Ta of the adhesive layer Ta, the coefficient of elasticity Ea of the adhesive layer 38, and the length Wa of the partition wall section 10*a* in the width direction (step S35), and the value of A ($A=((Tv+Tp)^3)\times(Ev+Ep)/2)/Wc^{1/2}$) corresponding to the calculated value of B is determined within the range of the area X in FIG. 12 (preferably, within the range Y) (step S36). Further, a range of the thickness Tp of the piezoelectric layer is determined from the determined value of A, the thickness Tv of the vibration plate 30, the coefficient of elasticity Ev of the vibration plate 30, the coefficient of elasticity Ep of the piezoelectric layer 31, and the width Wc of the pressure chamber 14 (step S37).

Further, the piezoelectric layer 31 is formed such that the thickness of the piezoelectric layer is the thickness Tp as determined in step S37 (step of forming the piezoelectric layer: S38). In this case, when the piezoelectric layer 31 is formed by the AD method, the piezoelectric layer 31 of the predetermined thickness Tp is formed on the vibration plate 30 by spraying an aerosol which is obtained by mixing the particles of the piezoelectric material and a carrier gas while adjusting the traveling velocity and traveling frequency of a stage to which the vibration plate 30 is attached. Further, after forming the individual electrodes 32 by a method such as screen printing on a surface of the piezoelectric layer 31 on a side opposite to the cavity plate 10 (step S39), the nozzle plate 13 is adhered to the manifold plate 12 (step S40), and the process of manufacturing the ink-jet head 1 is completed.

Thus, after measuring the thickness Tv of the vibration plate 30 and the thickness Ta of the adhesive layer 38, the piezoelectric layer 31 is formed while adjusting the thickness Tp of the piezoelectric layer 31 such that the values of A and B defined by the parameters of the piezoelectric actuator 3 such as TV, Ta, or the thickness Tp of the piezoelectric layer 31 satisfy the predetermined relationship as mentioned above. Accordingly, similarly as in the embodiment mentioned above, it is possible to suppress effectively the fluctuation in the velocity of the ink droplet due to the difference in print patterns, the fluctuation being caused due to the cross talk.

Third Modified Embodiment

In the second modified embodiment (see FIG. 14) mentioned above, the vibration plate 30 and the cavity plate 10 are adhered with the adhesive (step S33). However, the thickness Tv of the vibration plate may be measured after joining at the same time the vibration plate 30 and the metal plates 10 to 12 which construct the channel unit 2, by the metallic diffusion joining Thus, when the vibration plate 30 and the cavity plate 10 are joined by the metallic diffusion joining, since the thickness Ta of the adhesive layer 38 is zero, the step for measuring Ta (step S34 in FIG. 14) is not required.

Fourth Modified Embodiment

Figure 15:
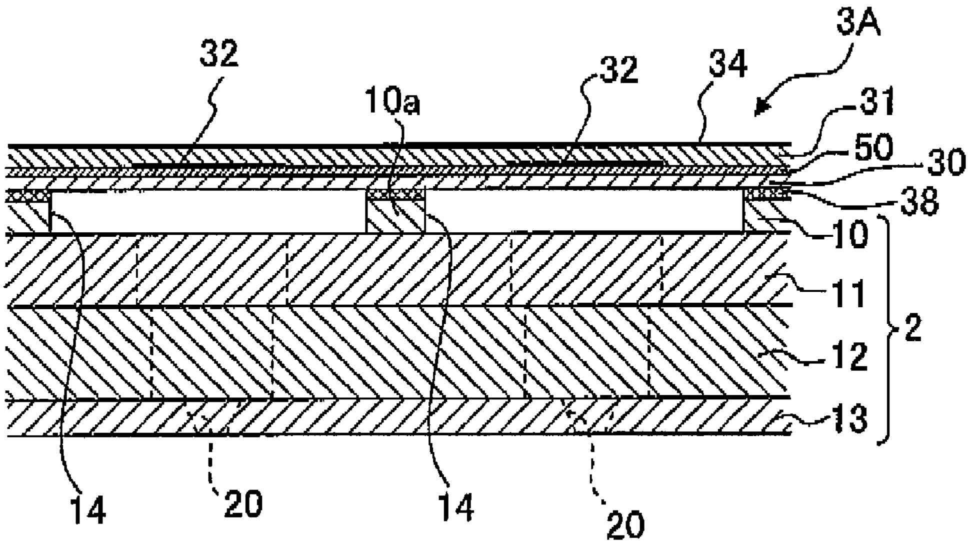
FIG. 15 is a cross-sectional view of an ink-jet head of a fourth modified embodiment corresponding to FIG. 5.

In the piezoelectric actuator 3 of the embodiment mentioned above, the individual electrodes 32 are formed on the piezoelectric layer 31 on the side opposite to the vibration plate 30 (see FIGS. 4 to 7). However, the individual electrodes 32 may be arranged on the piezoelectric layer 31 on the side of the vibration plate 30 and a common electrode 34 may be arranged on the piezoelectric layer 31 on the side opposite to the vibration plate 30. However, when the vibration plate 30 is made of a metallic material, it is necessary in a piezoelectric actuator 3A that a surface of the metallic vibration plate 30 on which the individual electrodes 32 are formed is nonconductive by forming, for example, an insulating material layer 50 on the upper surface (the surface on a side opposite to the pressure chamber 14) of the metallic vibration plate 30, as shown in FIG. 15. This insulating material layer 50 can be formed of a ceramics material such as alumina and zirconia by a method such as the AD method, the sputtering method, the CVD method, or the sol-gel method.

Fifth Modified Embodiment

Figure 16:
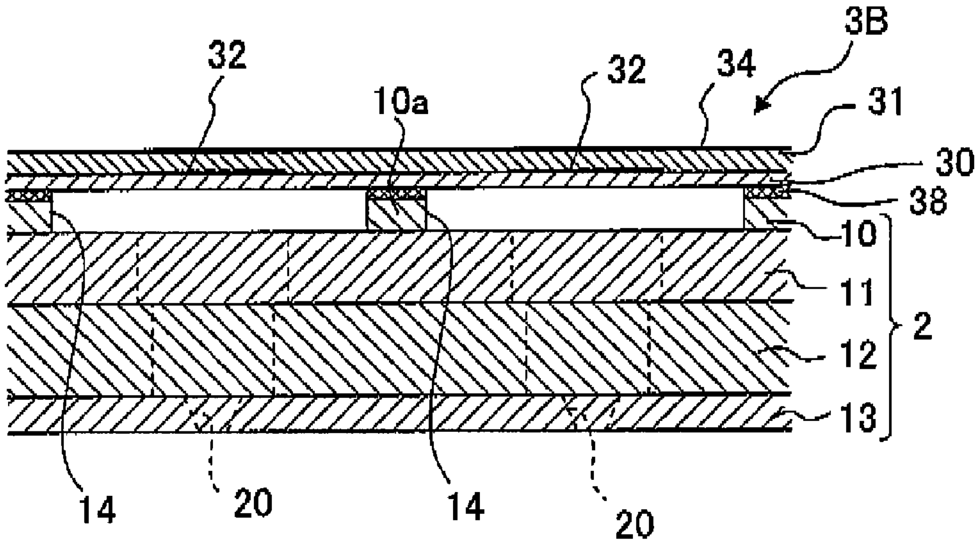
FIG. 16 is a cross-sectional view of an ink-jet head of a fifth modified embodiment corresponding to FIG. 5.

In the fourth modified embodiment, when the vibration plate 30 is made of an insulating material such as a ceramics material and a synthetic resin material, or a silicon material having an oxide film formed on a surface thereof, in a piezoelectric actuator 3D, the individual electrodes 32 may be arranged directly on the upper surface of the vibration plate 30 as shown in FIG. 16, and the space between the plurality of individual electrodes 32 may be insulated by the vibration plate 30 which is nonconductive.

In the embodiment mentioned above, the channel unit 2 having the individual channel unit 21 therein is constructed mainly of laminated metallic plates (cavity plate 10, base plate 11, and the manifold plate 12). However, the channel unit 2 may be formed of a material other than the metallic material (such as silicon material).

The embodiment mentioned above is exemplified by a case in which the present invention is applied to a type of an actuator in which the vibration plate is deformed to project toward the pressure chamber when the piezoelectric layer is contracted (type that is capable of performing "pushing ejection"). However, the present invention can also be applied to a type of an actuator in which the vibration plate is deformed to cave away from the pressure chamber when the piezoelectric layer is contracted (type that is capable of performing "pulling ejection").

The embodiment and the modified embodiments described above are examples in which the present invention is applied to the ink-jet head which transports ink. However, the present invention can also be applied to a liquid transporting apparatus which transports a liquid other than ink.

What is claimed is:

1. A liquid transporting apparatus comprising:

a channel unit which includes a plurality of pressure chambers arranged along a flat plane and in which the pressure chambers are separated by partition wall sections; and a piezoelectric actuator which is arranged on one surface of the channel unit and which changes selectively a volume of the plurality of pressure chambers, wherein the piezoelectric actuator includes;

a vibration plate which is adhered to the partition wall sections to cover the plurality of pressure chambers;

a piezoelectric layer which is arranged on a side of the vibration plate opposite to the pressure chambers to cover all of the pressure chambers as viewed from a direction orthogonal to the flat plane;

a plurality of individual electrodes which are arranged on one surface of the piezoelectric layer corresponding to the plurality of pressure chambers respectively; and a common electrode which is arranged on the other surface of the piezoelectric layer; and wherein a thickness of the piezoelectric layer or a thickness of an adhesive layer between the vibration plate and the partition wall sections is determined based on a parameter which is represented by $A=((Tv+Tp)^3\times(Ev+Ep)/2)/Wc^{1/2}$ wherein a thickness of the vibration plate is Tv (mm), a coefficient of elasticity of the vibration plate is Ev ($kg/mm^2$), the thickness of the piezoelectric layer is Tp (mm), a coefficient of elasticity of the piezoelectric layer is Ep ($kg/mm^2$), and a length of each of the pressure chambers in a predetermined direction is Wc (mm).

2. The liquid transporting apparatus according to claim 1, wherein when a length of each of the partition wall sections in the predetermined direction is Wa (mm), a thickness of the adhesive layer which is interposed between the partition wall sections and the vibration plate and which adheres the partition wall sections and the vibration plate is Ta (mm), a coefficient of elasticity of the adhesive layer is Ea ($kg/mm^2$), and $B=Ea\times Wa/Ta$, values of A and B satisfy a relationship of $-0.03A-1200(1/B)+0.08>0$.

3. The liquid transporting apparatus according to claim 1, wherein the vibration plate is joined to the partition wall sections by a metallic diffusion joining and the thickness Tp of the piezoelectric layer satisfies a relationship of $0.08>0.03\times((Tv+Tp)^3\times(Ev+Ep)/2)/Wc^{1/2}$.

4. The liquid transporting apparatus according to claim 2, wherein the values of A and B satisfy a relationship of $-0.03A-700(1/B)+0.05>0$.

5. The liquid transporting apparatus according to claim 1, wherein the vibration plate functions as the common electrode.

6. A method of manufacturing a liquid transporting apparatus which includes a channel unit which has a plurality of pressure chambers arranged along a flat plane and in which the pressure chambers are separated by partition wall sections, and a piezoelectric actuator which is arranged on one surface of the channel unit, which changes selectively a volume of the plurality of pressure chambers and which includes a vibration plate which covers the plurality of pressure chambers, a piezoelectric layer which is arranged on a side of the vibration plate opposite to the pressure chambers to cover all of the plurality of pressure chambers as viewed from a direction orthogonal to the flat plane, a plurality of individual electrodes which are arranged on one surface of the piezoelectric layer corresponding to the plurality of pressure chambers respectively, and a common electrode which is arranged on the other surface of the piezoelectric layer, the method comprising the steps of:

providing the channel unit;

adhering the vibration plate to the partition wall sections of the channel unit;

providing the piezoelectric layer to one surface of the vibration plate; and determining a thickness of the piezoelectric layer or a thickness of an adhesive layer between the vibration plate and the particle wall sections based on a parameter which is represented by $A=((TV+Tp)^3 \times(Ev+Ep)/2) Wc^{1/2}$ wherein a thickness of the vibration plate is Tv (mm), a coefficient of elasticity of the vibration plate is Ev ($kg/mm^2$), the thickness of the piezoelectric layer is Tp (mm), a coefficient of elasticity of the piezoelectric layer is Vp ($kg/mm^2$), and a length of each of the pressure chambers in a predetermined direction is Wc (mm).

7. The method of manufacturing the liquid transporting apparatus according to claim 6, wherein the thickness of the piezoelectric layer or the thickness of the adhesive layer between the vibration plate and the partition wall sections is determined such that values of A and B satisfy a relationship of $-0.03A-1200(1/B)+0.08>0$ wherein a length of each of the partition wall sections in the predetermined direction is Wa (mm), a thickness of the adhesive layer which is interposed between the partition wall sections and the vibration plate and which adheres the partition wall sections and the vibration plate is Ta (mm), a coefficient of elasticity of the adhesive layer is Ea (kg/mm2), and $B=Ea\times Wa/Ta$.

8. The method of manufacturing the liquid transporting apparatus according to claim 7, wherein the thickness of the adhesive layer is determined such that the values of A and B satisfy the relationship of $-0.03A-1200(1/B)+0.08>0$.

9. The method of manufacturing the liquid transporting apparatus according to claim 8, further comprising the steps of:

measuring the thickness of the piezoelectric layer; and measuring the thickness of the vibration plate.

10. The method of manufacturing the liquid transporting apparatus according to claim 9, wherein the values of A and B satisfy a relationship of $-0.03A-700(1/B)+0.05>0$.

11. The method of manufacturing the liquid transporting apparatus according to claim 7, wherein the thickness of the piezoelectric layer is determined such that the values of A and B satisfy the relationship of $-0.03A-1200(1/B)+0.08>0$.

12. The method of manufacturing the liquid transporting apparatus according to claim 11, further comprising the steps of:

measuring the thickness of the vibration plate; and measuring the thickness of the adhesive layer.

13. The method of manufacturing the liquid transporting apparatus according to claim 12, wherein the values of A and B satisfy a relationship of $-0.03A-700(1/B)+0.05>0$.

14. The method of manufacturing the liquid transporting apparatus according to claim 11, wherein the vibration plate is joined to the partition wall sections by a metallic diffusion joining and the thickness Tp of the piezoelectric layer is determined to satisfy a relationship of $0.08>0.03\times((Tv+Tp)^3\times(Ev+Ep)/2)/Wc^{1/2}$.

15. The method of manufacturing the liquid transporting apparatus according to claim 7, wherein the vibration plate functions as the common electrode.

* * * * *